(12) United States Patent
Yamano et al.

(10) Patent No.: US 10,186,718 B2
(45) Date of Patent: Jan. 22, 2019

(54) FUEL CELL

(71) Applicant: HONDA MOTOR CO., LTD., Tokyo (JP)

(72) Inventors: Naoki Yamano, Wako (JP); Toshiki Kawamura, Wako (JP); Shuhei Goto, Wako (JP); Narutoshi Sugita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/299,468

(22) Filed: Oct. 21, 2016

(65) Prior Publication Data

US 2017/0117559 A1    Apr. 27, 2017

(30) Foreign Application Priority Data

Oct. 22, 2015   (JP) ................. 2015-208404

(51) Int. Cl.

| | |
|---|---|
| H01M 8/0265 | (2016.01) |
| H01M 8/026 | (2016.01) |
| H01M 8/1018 | (2016.01) |
| H01M 8/0267 | (2016.01) |
| H01M 8/04007 | (2016.01) |
| H01M 8/1004 | (2016.01) |

(52) U.S. Cl.
CPC ......... H01M 8/0265 (2013.01); H01M 8/026 (2013.01); H01M 8/0267 (2013.01); H01M 8/1018 (2013.01); H01M 8/04067 (2013.01); H01M 8/1004 (2013.01); H01M 2008/1095 (2013.01); H01M 2250/20 (2013.01); Y02T 90/32 (2013.01)

(58) Field of Classification Search
CPC ..... H01M 2008/1095; H01M 2250/20; H01M 8/026; H01M 8/0265; H01M 8/0267; H01M 8/04067; H01M 8/1004; H01M 8/1018

See application file for complete search history.

(56) References Cited

U.S. PATENT DOCUMENTS

| | | | |
|---|---|---|---|
| 2004/0151973 A1* | 8/2004 | Rock ................... | H01M 8/0247 429/446 |
| 2013/0337359 A1* | 12/2013 | Sugiura ............... | H01M 8/1006 429/457 |
| 2016/0211533 A1 | 7/2016 | Ishida et al. | |

FOREIGN PATENT DOCUMENTS

JP        2014-137937        7/2014

* cited by examiner

*Primary Examiner* — Jonathan G Leong
*Assistant Examiner* — Victoria H Lynch
(74) *Attorney, Agent, or Firm* — Mori & Ward, LLP

(57) ABSTRACT

A fuel cell includes a membrane electrode assembly, a first metal separator, a second metal separator, linear protrusions, and embossed protrusions. The first metal separator is stacked on the membrane electrode assembly. The second metal separator is stacked on the first metal separator to define a coolant channel between the metal separators. The first metal separator includes wave-shaped protrusions projecting from the first metal separator by a first height to define to form the coolant channel. The linear protrusions are connected to both distal ends of each of the wave-shaped protrusions. The linear protrusions project from the first metal separator by a second height smaller than the first height. The embossed protrusions are connected to tip ends of the linear protrusions. The embossed protrusions project from the first metal separator by a third height larger than the second height to be in contact with the second metal separator.

9 Claims, 7 Drawing Sheets

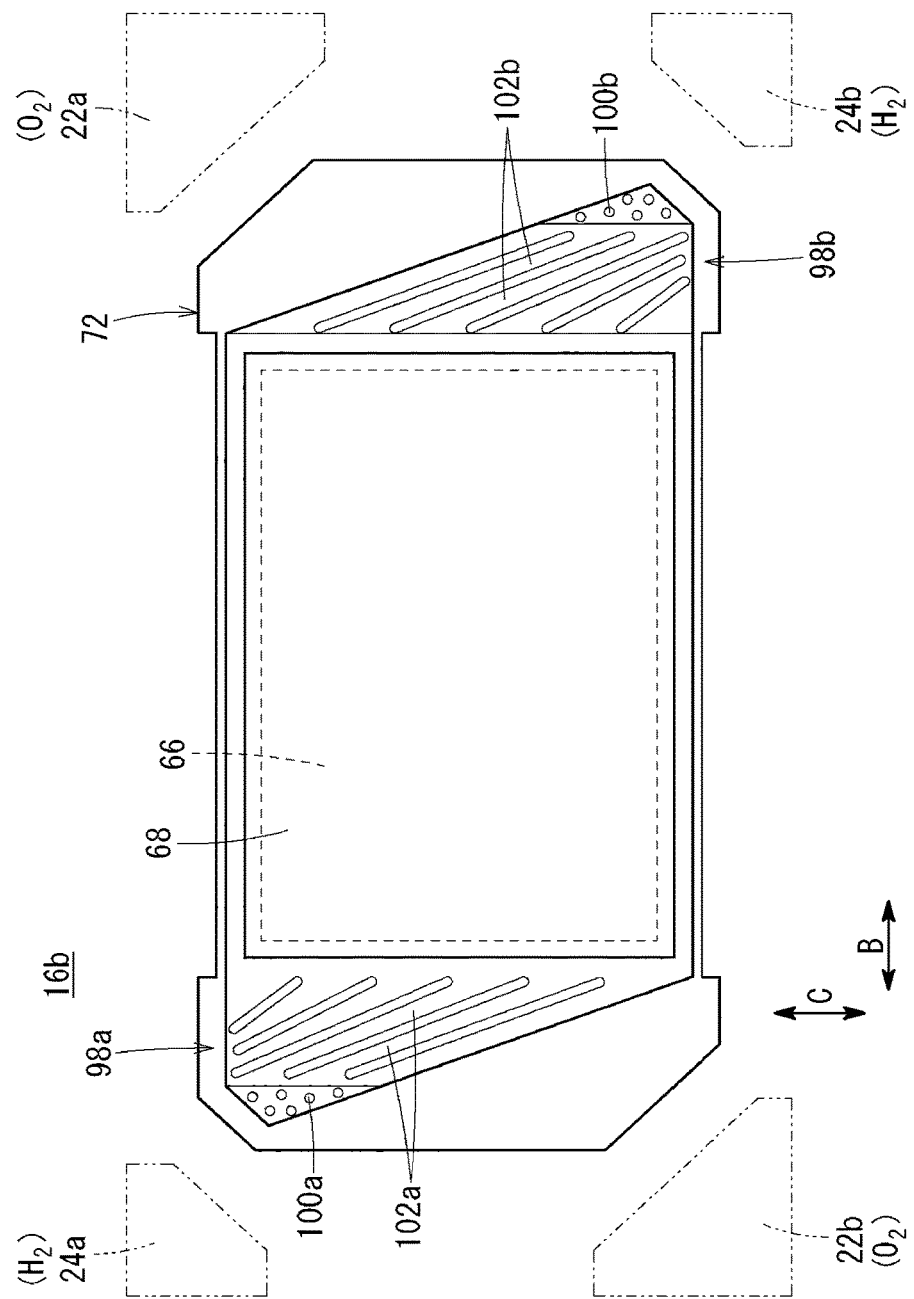

FUEL CELL

CROSS-REFERENCE TO RELATED APPLICATIONS

The present application claims priority under 35 U.S.C. § 119 to Japanese Patent Application No. 2015-208404, filed Oct. 22, 2015, entitled "Fuel Cell." The contents of this application are incorporated herein by reference in their entirety.

BACKGROUND

1. Field

The present disclosure relates to a fuel cell.

2. Description of the Related Art

In general, a solid polymer electrolyte fuel cell includes a solid polymer electrolyte membrane, which is a polymer ion-exchange membrane. The fuel cell includes a membrane electrode assembly (MEA), in which an anode electrode is disposed on one surface of the solid polymer electrolyte membrane and a cathode electrode is disposed on the other surface of the solid polymer electrolyte membrane. The anode electrode and the cathode electrode each include a catalyst layer (electrode catalyst layer) and a gas diffusion layer (porous carbon).

The membrane electrode assembly and separators (bipolar plates) that sandwich the membrane electrode assembly constitute a power generation cell (unit fuel cell). A predetermined number of power generation cells are stacked and used, for example, as a vehicle fuel cell stack.

In some fuel cells, metal separators having thin plate-like shapes are used. On a surface of one of the metal separators facing the anode electrode, a plurality of wave-shaped fuel gas channels (reactant gas channels), which are wave-shaped in plan view, are formed. A fuel gas flows through the fuel gas channels along an electrode surface of the anode electrode. On a surface of one of the metal separators facing the cathode electrode, a plurality of wave-shaped oxidant gas channels (reactant gas channels), which are wave-shaped in plan view, are formed. An oxidant gas flows through the oxidant gas channels along an electrode surface of the cathode electrode.

A coolant channel is formed between the back side of the wave-shaped fuel gas channels of one of the separators and the back side of the wave-shaped oxidant gas channels of an adjacent separator. A coolant flows through the coolant channel in a direction along the electrode surfaces.

When the fuel cell is a so-called "internal-manifold fuel cell", a reactant gas manifold, through which a reactant gas flows, and a coolant manifold, through which a coolant flows, are formed so as to extend through the power generation cell in the stacking direction. In this case, because the reactant gas manifold has a comparatively small opening area, in order to uniformly and reliably supply the reactant gas to an electrode reaction surface, a buffer portion, which includes a plurality of embossed portion or guide portions, is formed between the reactant gas manifold and the reactant gas channel. For example, Japanese Unexamined Patent Application Publication No. 2014-137937 describes a fuel cell stack utilizing such technology.

SUMMARY

According to one aspect of the present invention, a fuel cell includes a membrane electrode assembly and metal separators. In the membrane electrode assembly, electrodes are disposed on both sides of an electrolyte membrane. The metal separators are stacked on the membrane electrode assembly. A coolant channel is formed between a first metal separator and a second metal separator that are adjacent to each other. The coolant channel allows a coolant to flow in a direction along an electrode surface. The first metal separator includes wave-shaped protrusions, linear protrusions, and embossed protrusions. Between each pair of the wave-shaped protrusions, a wave-shaped channel groove is formed. Each of the wave-shaped protrusions has a wave shape in plan view. The wave-shaped channel groove is included in the coolant channel. The linear protrusions are connected to both ends of each of the wave-shaped protrusions. Each of the linear protrusions has a height smaller than that of each of the wave-shaped protrusions. Each of the embossed protrusions is connected to an end portion of a corresponding one of the linear protrusions. Each of the embossed protrusions has a height larger than that of each of the linear protrusions and is in contact with the second metal separator.

According to another of the present invention, a fuel cell includes a membrane electrode assembly, a first metal separator, a second metal separator, first and second linear protrusions, and first and second embossed protrusions. The membrane electrode assembly has a first end and second end opposite to the first end in an extending direction. The membrane electrode assembly includes an electrolyte membrane and first and second electrodes sandwiching the electrolyte membrane therebetween in a stacking direction substantially perpendicular to the extending direction. The first metal separator is stacked on the membrane electrode assembly in the stacking direction. The second metal separator is stacked on the first metal separator in the stacking direction to define a coolant channel between the first metal separator and the second metal separator. The coolant channel extends in the extending direction. The first metal separator includes wave-shaped protrusions each of which has a wave shape viewed in the stacking direction and projects from the first metal separator toward the second metal separator by a first height in the stacking direction to define a wave-shaped channel groove between the wave-shaped protrusions to form the coolant channel. Each of the wave-shaped protrusions has a first distal end and the second distal end opposite to the first distal end in the extending direction. The first and second linear protrusions are connected to the first distal end and the second distal end of each of the wave-shaped protrusions, respectively. Each of the first and second linear protrusions has a straight shape extending in the extending direction and projects from the first metal separator toward the second metal separator by a second height in the stacking direction. The second height is smaller than the first height. The first and second embossed protrusions are connected to a first tip end of the first linear protrusion and the second tip end of the second linear protrusion, respectively. The first and second embossed protrusions projects from the first metal separator toward the second metal separator by a third height in the stacking direction to be in contact with the second metal separator. The third height is larger than the second height.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 7 is a plan view of a second membrane electrode assembly of the power generation cell.

DESCRIPTION OF THE EMBODIMENTS

Figure 1:
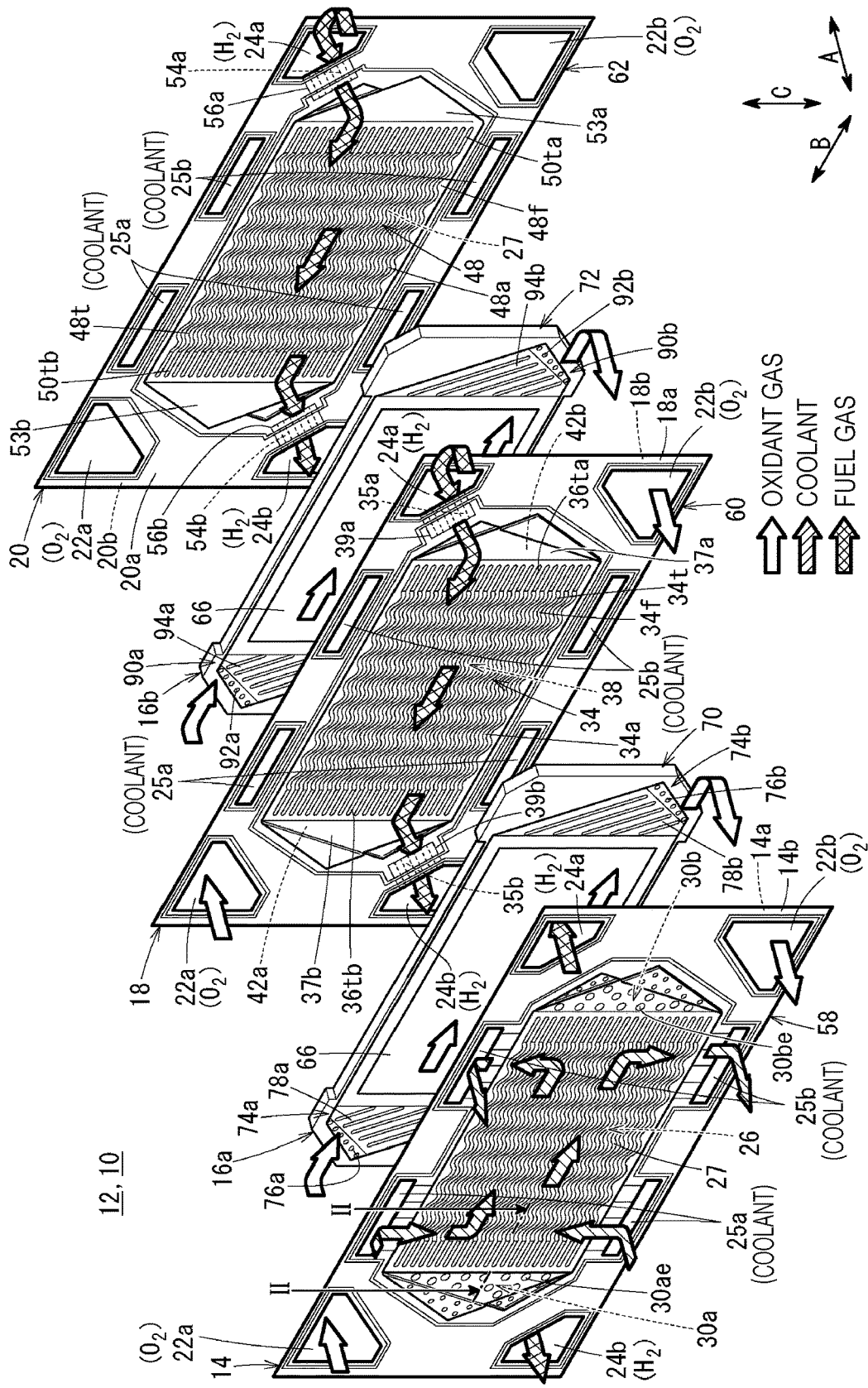
FIG. 1 is an exploded perspective view of a power generation cell included in a fuel cell according to an embodiment of the present disclosure.

The embodiment(s) will now be described with reference to the accompanying drawings, wherein like reference numerals designate corresponding or identical elements throughout the various drawings.

Figure 2:
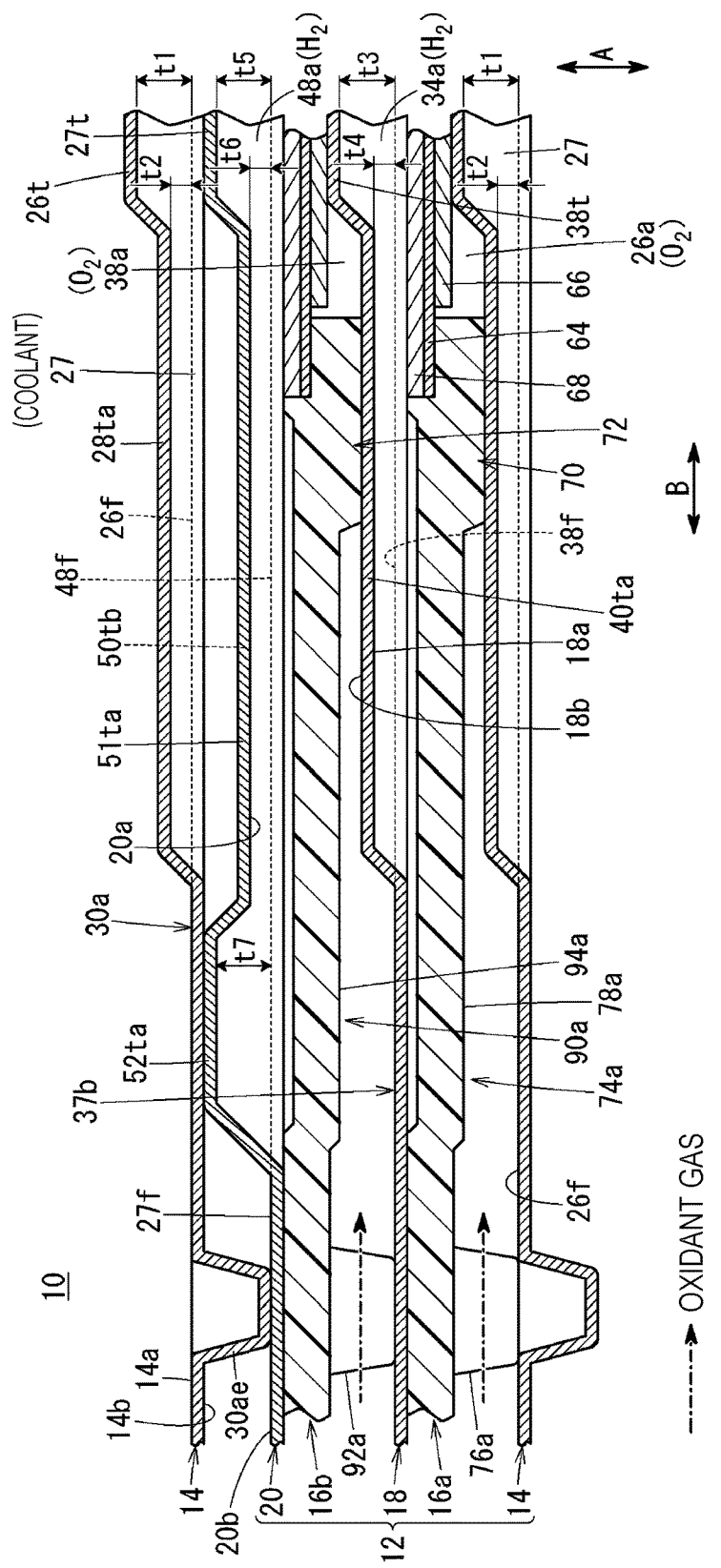
FIG. 2 is a sectional view of the power generation cell taken along line II-II of FIG. 1.

Referring to FIGS. 1 and 2, a fuel cell 10 according to an embodiment of the present disclosure includes a plurality of power generation cells 12 that are stacked in a horizontal direction (direction of arrow A) or in a vertical direction (direction of arrow C). The fuel cell 10 is used, for example, as a vehicle fuel cell stack mounted in a fuel cell electric automobile (not shown).

Each of the power generation cells 12 includes a first metal separator 14, a first membrane electrode assembly 16a, a second metal separator 18, a second membrane electrode assembly 16b, and a third metal separator 20.

Each of the first metal separator 14, the second metal separator 18, and the third metal separator 20 is made from, for example, a steel plate, a stainless steel plate, an aluminum plate, a galvanized steel plate, or the like. Each of the first metal separator 14, the second metal separator 18, and the third metal separator 20, which has a rectangular shape in plan view, is made by press-forming a thin metal plate so as to have a wave-shaped cross section.

Referring to FIG. 1, an oxidant gas inlet manifold 22a and a fuel gas outlet manifold 24b are disposed in the power generation cell 12 so as to extend in the direction of arrow A through one end portion of the power generation cell 12 in the longitudinal direction (direction of arrow B). An oxidant gas, such as an oxygen-containing gas, is supplied through the oxidant gas inlet manifold 22a. A fuel gas, such as a hydrogen-containing gas, is discharged through the fuel gas outlet manifold 24b.

A fuel gas inlet manifold 24a and an oxidant gas outlet manifold 22b are disposed in the power generation cell 12 so as to extend in the direction of arrow A through the other end portion of the power generation cell 12 in the longitudinal direction. The fuel gas is supplied through the fuel gas inlet manifold 24a. The oxidant gas is discharged through the oxidant gas outlet manifold 22b.

A pair of coolant inlet manifolds 25a are disposed in the power generation cell 12 so as to extend in the direction arrow A through upper and lower end portions (that are near the oxidant gas inlet manifold 22a) of the power generation cell 12 in the transversal direction (direction of arrow C). A coolant is supplied through the coolant inlet manifolds 25a. A pair of coolant outlet manifolds 25b are disposed in upper and lower end portions (that are near the fuel gas inlet manifold 24a) of the power generation cell 12 in the transversal direction. The coolant is discharged through the coolant outlet manifolds 25b.

Figure 3:
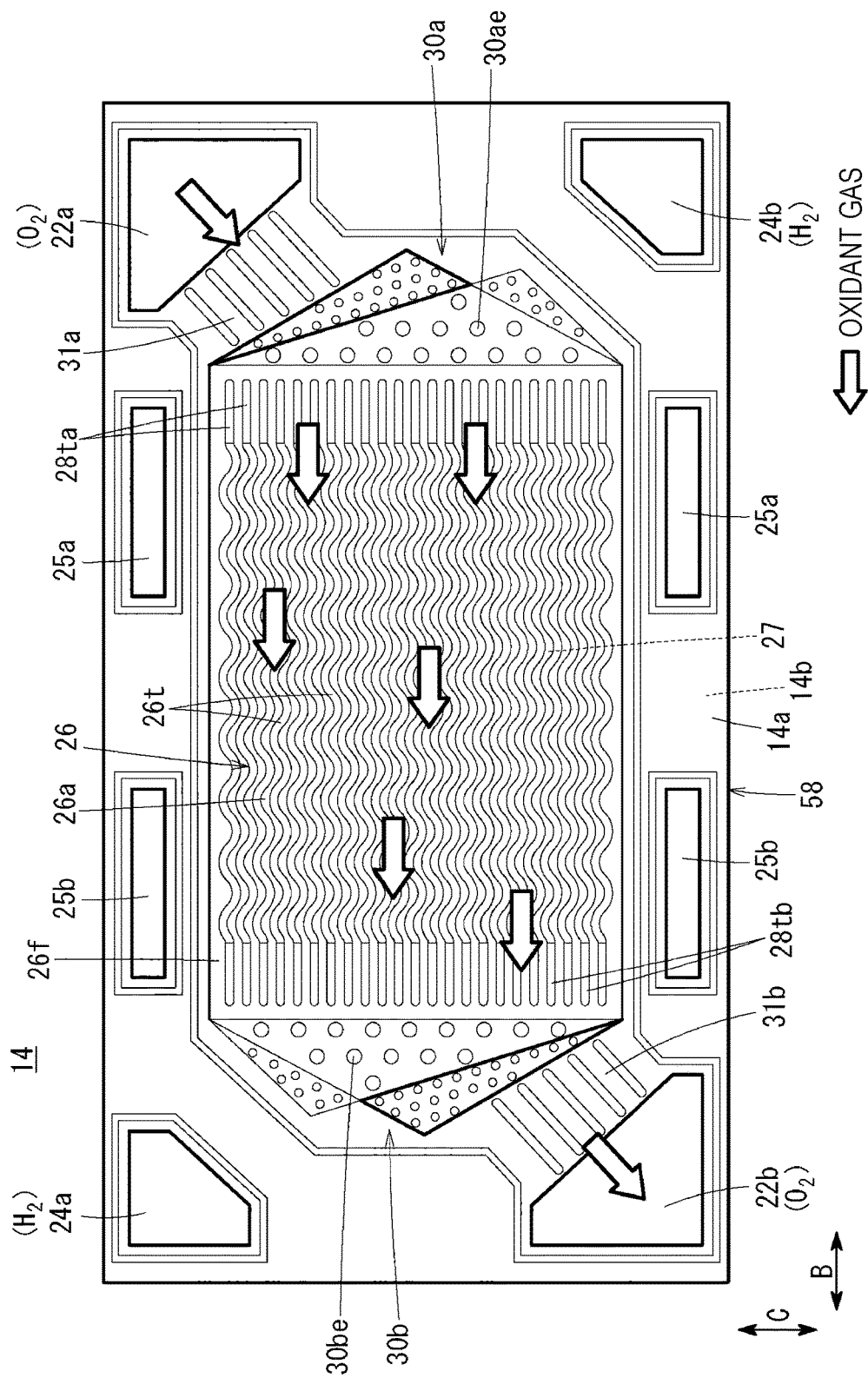
FIG. 3 is a plan view of a first metal separator of the power generation cell.

Referring to FIG. 3, a first oxidant gas channel 26, which is connected to the oxidant gas inlet manifold 22a and the oxidant gas outlet manifold 22b, is formed on a surface 14a of the first metal separator 14 (corresponding to "a second one of the metal separators" in the claims) facing the first membrane electrode assembly 16a. The back side of the first oxidant gas channel 26 forms a part of a coolant channel 27.

The first oxidant gas channel 26 includes wave-shaped channel grooves 26a, which are formed between a plurality of wave-shaped protrusions 26t extending in the direction of arrow B. Each of the wave-shaped protrusions 26t has a wave shape in plan view, and each of the wave-shaped channel grooves 26a has a wave shape in plan view. Each of the wave-shaped channel grooves 26a may have a curved wave shape, which is made up of curved segments, or may have a zigzag shape, which is made up of linear segments. Other wave-shaped protrusions described below are structured in the same way as the wave-shaped protrusions 26t. An inlet linear protrusion 28ta and an outlet linear protrusion 28tb are respectively connected to an inlet end portion and an outlet end portion of each of the wave-shaped protrusions 26t.

Referring to FIG. 2, the height t2 of the inlet linear protrusion 28ta from a flat surface 26f is smaller than the height t1 of the wave-shaped protrusion 26t from the flat surface 26f (t1>t2). The outlet linear protrusion 28tb is structured in the same way as the inlet linear protrusion 28ta.

Because the height of each of the inlet linear protrusions 28ta and the outlet linear protrusions 28tb is smaller than that of each of the wave-shaped protrusions 26t, the depths of channels formed between the inlet linear protrusions 28ta and the outlet linear protrusions 28tb are smaller than the depths of the wave-shaped channel grooves 26a. Therefore, pressure drop in the channels between the inlet linear protrusions 28ta and between the outlet linear protrusions 28tb is large, and high drainage performance is obtained. As described below, each the first metal separator 14, the second metal separator 18, and the third metal separator 20 includes inlet linear protrusions and outlet linear protrusions, each having a height smaller than that of each of the wave-shaped protrusions, so that the flow conditions and the like of the reactant gases can be made uniform.

Referring to FIG. 3, a first oxidant gas inlet buffer portion 30a is disposed outward from the inlet linear protrusions 28ta, and a first oxidant gas outlet buffer portion 30b is disposed outward from the outlet linear protrusions 28tb. A plurality of embossed protrusions 30ae (the other embossed protrusions) are formed in the first oxidant gas inlet buffer portion 30a so as to protrude beyond a surface 14b (toward the coolant channel 27). A plurality of embossed protrusions 30be (the other embossed protrusions) are formed in the first oxidant gas outlet buffer portion 30b so as to protrude beyond the surface 14b (toward the coolant channel 27). The embossed protrusions 30ae and 30be each may have a circular shape, an elliptical shape, or a polygonal shape, such as a quadrangular shape.

A plurality of inlet connection grooves 31a are formed between the first oxidant gas inlet buffer portion 30a and the oxidant gas inlet manifold 22a. A plurality of outlet connection grooves 31b are formed between the first oxidant gas outlet buffer portion 30b and the oxidant gas outlet manifold 22b.

Referring to FIG. 1, a first fuel gas channel 34, which is connected to the fuel gas inlet manifold 24a and the fuel gas outlet manifold 24*b*, is formed on a surface 18*a* of the second metal separator 18 facing the first membrane electrode assembly 16*a*. The first fuel gas channel 34 includes wave-shaped channel grooves 34*a*, which are formed between a plurality of wave-shaped protrusions 34*t* extending in the direction of arrow B. An inlet linear protrusion 36*ta* and an outlet linear protrusion 36*tb* are respectively connected to an inlet end portion and an outlet end portion of each of the wave-shaped protrusion 34*t*.

A first fuel gas inlet buffer portion 37*a* is disposed outward from the inlet linear protrusions 36*ta*, and a first fuel gas outlet buffer portion 37*b* is disposed outward from the outlet linear protrusions 36*tb*.

A plurality of inlet connection grooves 35*a* are formed between the first fuel gas inlet buffer portion 37*a* and the fuel gas inlet manifold 24*a*. The inlet connection grooves 35*a* are covered by a cover member 39*a*. A plurality of outlet connection grooves 35*b* are formed between the first fuel gas outlet buffer portion 37*b* and the fuel gas outlet manifold 24*b*. The outlet connection grooves 35*b* are covered by a cover member 39*b*.

Figure 4:
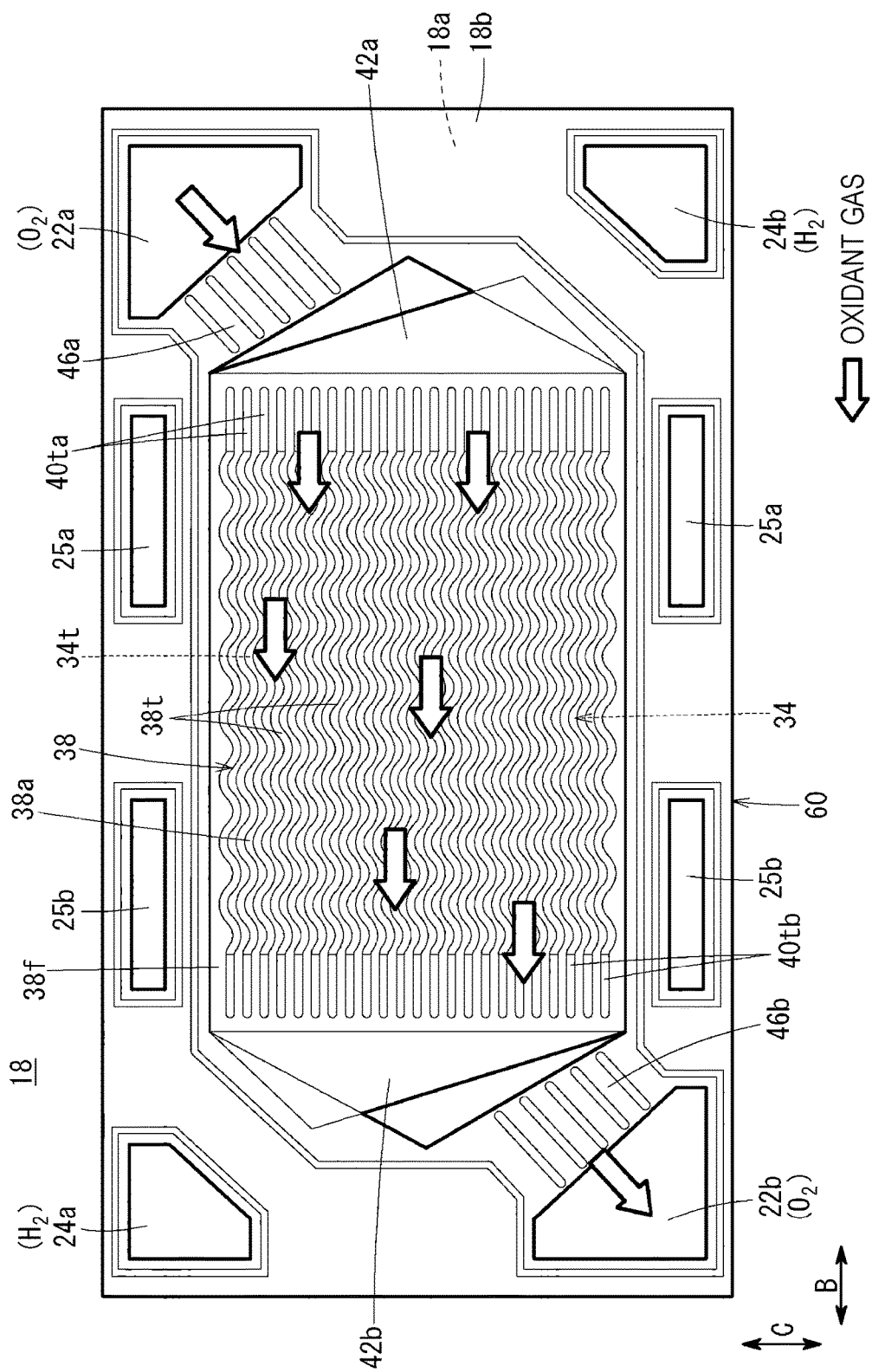
FIG. 4 is a plan view of a second metal separator of the power generation cell.

Referring to FIG. 4, a second oxidant gas channel 38, which is connected to the oxidant gas inlet manifold 22*a* and the oxidant gas outlet manifold 22*b*, is formed on a surface 18*b* of the second metal separator 18 facing the second membrane electrode assembly 16*b*. The second oxidant gas channel 38 includes wave-shaped channel grooves 38*a* (or linear channel grooves), which are formed between a plurality of wave-shaped protrusions 38*t* extending in the direction of arrow B. The shape of the back side of the second oxidant gas channel 38, which is formed on the second metal separator 18, is the shape of the first fuel gas channel 34.

An inlet linear protrusion 40*ta* and an outlet linear protrusion 40*tb* are respectively connected to an inlet end portion and an outlet end portion of each of the wave-shaped protrusions 38*t*. Referring to FIG. 2, the height t4 of the inlet linear protrusion 40*ta* from a flat surface 38*f* is smaller than the height t3 of the inlet linear protrusion 40*ta* from the flat surface 38*f* (t3>t4). The outlet linear protrusion 40*tb* is structured in the same way as the inlet linear protrusion 40*ta*.

Referring to FIG. 4, a second oxidant gas inlet buffer portion 42*a* is disposed outward from the inlet linear protrusions 40*ta*, and a second oxidant gas outlet buffer portion 42*b* is disposed outward from the outlet linear protrusions 40*tb*. A plurality of inlet connection grooves 46*a* are formed between the second oxidant gas inlet buffer portion 42*a* and the oxidant gas inlet manifold 22*a*. A plurality of outlet connection grooves 46*b* are formed between the second oxidant gas outlet buffer portion 42*b* and the oxidant gas outlet manifold 22*b*.

Referring to FIG. 1, a second fuel gas channel 48, which is connected to the fuel gas inlet manifold 24*a* and the fuel gas outlet manifold 24*b*, is formed on a surface 20*a* of the third metal separator 20 (corresponding to "a first one of the metal separators" in the claims) facing the second membrane electrode assembly 16*b*. The second fuel gas channel 48 includes wave-shaped channel grooves 48*a*, which are formed between a plurality of wave-shaped protrusions 48*t* extending in the direction of arrow B. An inlet linear protrusion 50*ta* and an outlet linear protrusion 50*tb* are respectively connected to an inlet end portion and an outlet end portion of each of the wave-shaped protrusions 48*t*.

A second fuel gas inlet buffer portion 53*a* is disposed at a position outward from the inlet linear protrusions 50*ta* and near the fuel gas inlet manifold 24*a*. A second fuel gas outlet buffer portion 53*b* is disposed at a position outward from the outlet linear protrusion 50*tb* and near the fuel gas outlet manifold 24*b*.

A plurality of inlet connection grooves 54*a* are formed between the second fuel gas inlet buffer portion 53*a* and the fuel gas inlet manifold 24*a*. The inlet connection grooves 54*a* are covered by a cover member 56*a*. A plurality of outlet connection grooves 54*b* are formed between the second fuel gas outlet buffer portion 53*b* and the fuel gas outlet manifold 24*b*. The outlet connection grooves 54*b* are covered by a cover member 56*b*.

Figure 5:
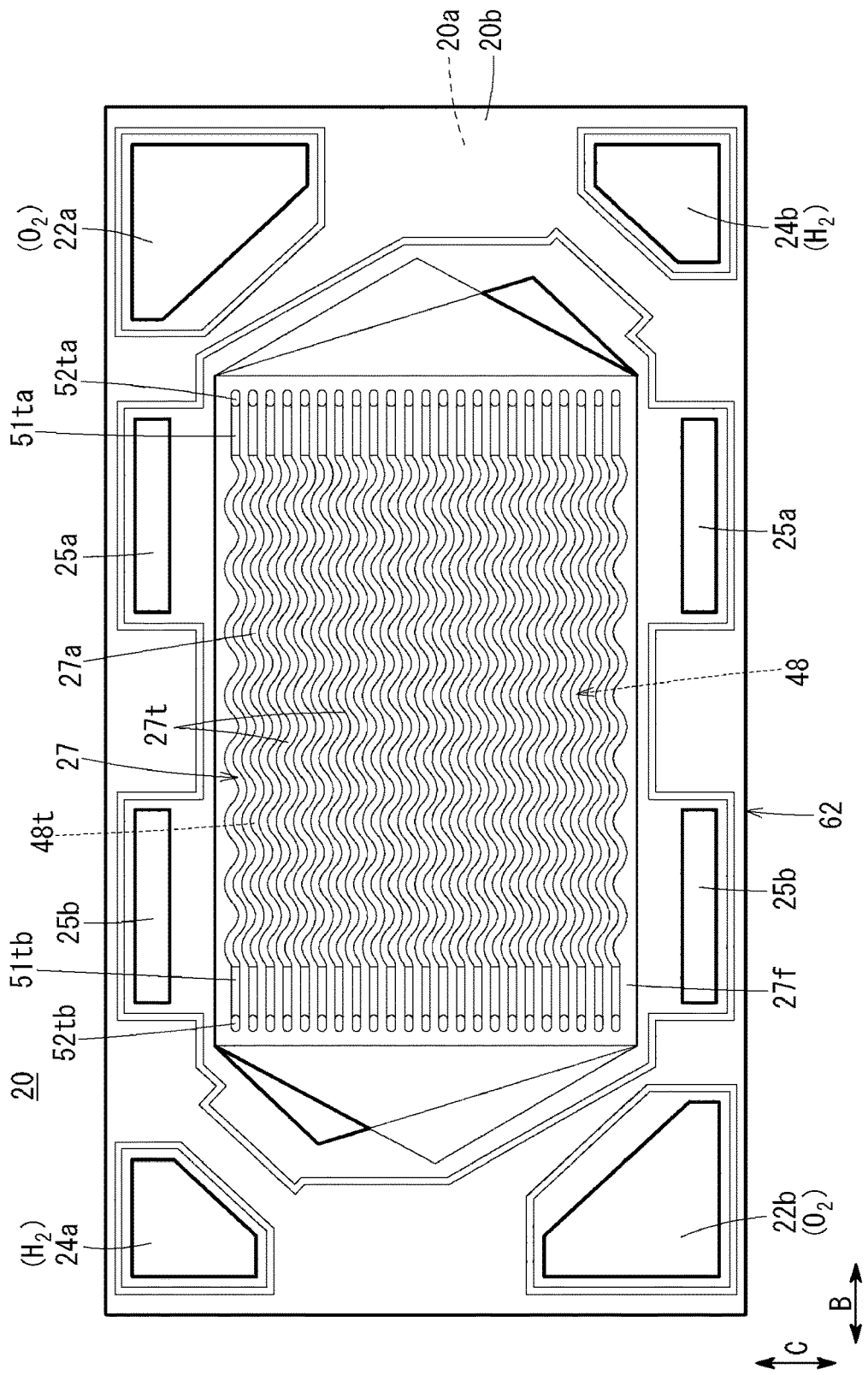
FIG. 5 is a plan view of a third metal separator of the power generation cell.

Referring to FIG. 5, on a surface 20*b* of the third metal separator 20, a part of the coolant channel 27 is formed on the back side of the second fuel gas channel 48. The coolant channel 27 includes wave-shaped channel grooves 27*a*, which are formed between a plurality of wave-shaped protrusions 27*t* extending in the direction of arrow B. An inlet linear protrusion 51*ta* and an outlet linear protrusion 51*tb* are respectively connected to an inlet end portion and an outlet end portion of each of the wave-shaped protrusion 27*t*.

An embossed protrusion 52*ta*, which protrudes from the second fuel gas channel 48 toward the coolant channel 27, is integrally formed with an end portion of each of the inlet linear protrusions 51*ta*. An embossed protrusion 52*tb*, which protrudes from the second fuel gas channel 48 toward the coolant channel 27, is integrally formed with an end portion of each of the outlet linear protrusions 51*tb*.

Referring to FIG. 2, the height t6 of the inlet linear protrusion 51*ta* from a flat surface 27*f* is smaller than the height t5 of the wave-shaped protrusion 27*t* from the flat surface 27*f* (t5>t6). The outlet linear protrusion 51*tb* is structured in the same way as the inlet linear protrusion 51*ta*.

The height t7 of the embossed protrusion 52*ta* from the flat surface 27*f* is larger than the height t6 of the inlet linear protrusion 51*ta* from the flat surface 27*f* (t7>t6). As long the embossed protrusion 52*ta* is in contact with the surface 14*b* of the first metal separator 14, the height t7 may be the same as the height t5 or may be different from the height t5. The embossed protrusion 52*tb* is structured in the same way as the embossed protrusion 52*ta*.

The wave-shaped protrusion 27*t* and the embossed protrusion 52*ta* are in contact with the surface 14*b* of an adjacent first metal separator 14, while the inlet linear protrusion 51*ta* is separated from the surface 14*b*. The embossed protrusion 30*ae* of the first metal separator 14 is in contact with the surface 20*b* of the third metal separator 20 at a position separated farther from the inlet linear protrusion 51*ta* than the embossed protrusion 52*ta* is. The outlet linear protrusion 51*tb* and the embossed protrusion 52*tb* are respectively structured in the same way as the inlet linear protrusion 51*ta* and the embossed protrusion 52*ta*. The embossed protrusion 30*be* is structured in the same way as the embossed protrusion 30*ae*.

When the surface 14*b* of the first metal separator 14 adjacent to the third metal separator 20 is placed on the surface 20*b* of the third metal separator 20, the coolant channel 27 is integrally formed on the surface 20*b*.

Referring to FIG. 1, a first sealing member 58 is integrally formed on the surfaces 14*a* and 14*b* of the first metal separator 14 so as to surround the outer peripheral end portion of the first metal separator 14. A second sealing member 60 is integrally formed on the surfaces 18*a* and 18*b* of the second metal separator 18 so as to surround the outer peripheral end portion of the second metal separator 18. A third sealing member 62 is integrally formed on the surfaces 20a and 20b of the third metal separator 20 so as to surround the outer peripheral end portion of the third metal separator 20.

The first sealing member 58, the second sealing member 60, and the third sealing member 62 are each made of an elastic rubber material, such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene rubber, and acrylic rubber.

Referring to FIG. 2, the first membrane electrode assembly 16a and the second membrane electrode assembly 16b each include a solid polymer electrolyte membrane 64, which is, for example, a thin film that is made of a perfluorosulfonic acid polymer including water. The solid polymer electrolyte membrane 64 is sandwiched between a cathode electrode 66 and an anode electrode 68.

Each of the first membrane electrode assembly 16a and the second membrane electrode assembly 16b is a stepped MEA in which the planar dimensions of the cathode electrode 66 are smaller than those of the anode electrode 68 and the solid polymer electrolyte membrane 64. Alternatively, the cathode electrode 66 may have planar dimensions the same as those of the anode electrode 68 and the solid polymer electrolyte membrane 64. The anode electrode 68 may have planar dimensions smaller than those of the cathode electrode 66 and the solid polymer electrolyte membrane 64.

The cathode electrode 66 and the anode electrode 68 each include a gas diffusion layer (not shown) and an electrode catalyst layer (not shown). The gas diffusion layer is made of carbon paper or the like. The electrode catalyst layer is formed by uniformly coating a surface of the gas diffusion layer with porous carbon particles whose surfaces support a platinum alloy. The electrode catalyst layers are formed, for example, on both sides of the solid polymer electrolyte membrane 64.

In the first membrane electrode assembly 16a, a first resin frame member 70 is disposed on an outer periphery of the solid polymer electrolyte membrane 64 so as to be located outward from an edge of the cathode electrode 66. The first resin frame member 70 is integrally formed, for example, by injection molding. In the second membrane electrode assembly 16b, a second resin frame member 72 is disposed on an outer periphery of the solid polymer electrolyte membrane 64 so as to be located outward from an edge of the cathode electrode 66. The second resin frame member 72 is integrally formed, for example, by injection molding.

An electrically insulating commodity plastic, an engineering plastic, a super engineering plastic, or the like may be used as the material of the first resin frame member 70 and the second resin frame member 72. Each of the resin frame members 70 and 72 may be made from, for example, a film or the like. The first resin frame member 70 and the second resin frame member 72 have outer shapes having dimensions such that the resin frame members 70 and 72 are disposed further inward than the manifolds, including the oxidant gas inlet manifold 22a.

Referring to FIG. 1, on a surface of the first resin frame member 70 on the cathode electrode 66 side, an inlet buffer portion 74a is disposed between the oxidant gas inlet manifold 22a and the inlet of the first oxidant gas channel 26. On the surface of the first resin frame member 70 on the cathode electrode 66 side, an outlet buffer portion 74b is disposed between the oxidant gas outlet manifold 22b and the outlet of the first oxidant gas channel 26.

The inlet buffer portion 74a includes a plurality of embossed portions 76a (or a flat surface), which are located close to the oxidant gas inlet manifold 22a, and a plurality of linear inlet guide channels 78a (or embossed portions), which are located close to the first oxidant gas channel 26. The outlet buffer portion 74b includes a plurality of embossed portions 76b (or a flat surface), which are located close to the oxidant gas outlet manifold 22b, and a plurality of linear outlet guide channels 78b (or embossed portions), which are located close to the first oxidant gas channel 26.

Figure 6:
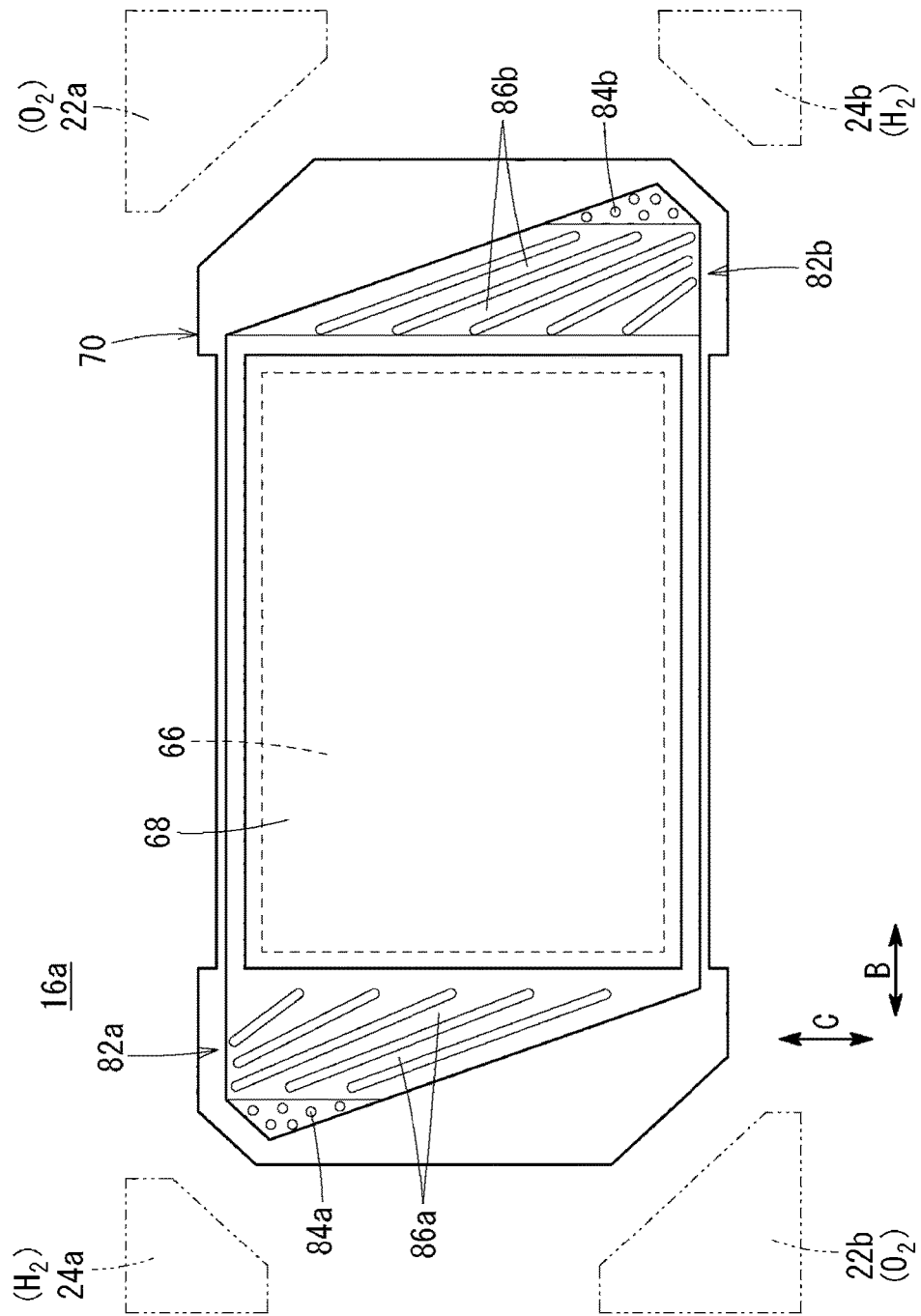
FIG. 6 is a plan view of a first membrane electrode assembly of the power generation cell.

Referring to FIG. 6, on a surface of the first resin frame member 70 on the anode electrode 68 side, an inlet buffer portion 82a is disposed between the fuel gas inlet manifold 24a and the first fuel gas channel 34. On the surface of the first resin frame member 70 on the anode electrode 68 side, an outlet buffer portion 82b is disposed between the fuel gas outlet manifold 24b and the first fuel gas channel 34.

The inlet buffer portion 82a includes a plurality of embossed portions 84a (or a flat surface), which are located close to the fuel gas inlet manifold 24a, and a plurality of linear inlet guide channels 86a (or embossed portions), which are located close to the first fuel gas channel 34. The outlet buffer portion 82b includes a plurality of embossed portions 84b (or a flat surface), which are located close to the fuel gas outlet manifold 24b, and a plurality of linear outlet guide channels 86b (or embossed portions), which are located close to the first fuel gas channel 34.

Referring to FIG. 1, on a surface of the second resin frame member 72 on the cathode electrode 66 side, an inlet buffer portion 90a is disposed between the oxidant gas inlet manifold 22a and the inlet of the second oxidant gas channel 38. On the surface of the second resin frame member 72 on the cathode electrode 66 side, an outlet buffer portion 90b is disposed between the oxidant gas outlet manifold 22b and the outlet of the second oxidant gas channel 38.

The inlet buffer portion 90a includes a plurality of embossed portions 92a (or a flat surface), which are located close to the oxidant gas inlet manifold 22a, and a plurality of linear inlet guide channels 94a (or embossed portions), which are located close to the second oxidant gas channel 38. The outlet buffer portion 90b includes a plurality of embossed portions 92b (or a flat surface), which are located close to the oxidant gas outlet manifold 22b, and a plurality of linear outlet guide channels 94b (or embossed portions), which are located close to the second oxidant gas channel 38.

Referring to FIG. 7, on a surface of the second resin frame member 72 on the anode electrode 68 side, an inlet buffer portion 98a is disposed between the fuel gas inlet manifold 24a and the second fuel gas channel 48. On the surface of the second resin frame member 72 on the anode electrode 68 side, an outlet buffer portion 98b is disposed between the fuel gas outlet manifold 24b and the second fuel gas channel 48.

The inlet buffer portion 98a includes a plurality of embossed portions 100a (or a flat surface), which are located close to the fuel gas inlet manifold 24a, and a plurality of linear inlet guide channels 102a (or embossed portions), which are located close to the second fuel gas channel 48. The outlet buffer portion 98b includes a plurality of embossed portions 100b (or a flat surface), which are located close to the fuel gas outlet manifold 24b, and a plurality of linear outlet guide channels 102b (or embossed portions), which are located close to the second fuel gas channel 48.

When two power generation cells 12 are stacked on top of each other, the coolant channel 27 is formed between the first metal separator 14 of one of the power generation cells 12 and the third metal separator 20 of the other power generation cell 12 (see FIGS. 1 and 2).

An operation of the fuel cell 10, which is structured as described above, will be described.

Referring to FIG. 1, an oxidant gas, such as an oxygen-containing gas, is supplied to the oxidant gas inlet manifold 22a. A fuel gas, such as a hydrogen-containing gas, is supplied to the fuel gas inlet manifold 24a. A coolant, such as pure water, ethylene glycol, or oil, is supplied to the pair of coolant inlet manifolds 25a.

A part of the oxidant gas flows through the oxidant gas inlet manifold 22a, the inlet buffer portion 74a, and the first oxidant gas inlet buffer portion 30a; and is supplied to the first oxidant gas channel 26 of the first metal separator 14 (see FIGS. 1 to 3). The remaining part of the oxidant gas flows through the oxidant gas inlet manifold 22a, the inlet buffer portion 90a, and the second oxidant gas inlet buffer portion 42a; and flows into the second oxidant gas channel 38 of the second metal separator 18 (see FIGS. 1 and 4).

Referring to FIGS. 1, 3, and 4, the oxidant gas is supplied to the cathode electrode 66 of the first membrane electrode assembly 16a while flowing along the first oxidant gas channel 26 in the direction of arrow B (horizontal direction). Likewise, the oxidant gas is supplied to the cathode electrode 66 of the second membrane electrode assembly 16b while flowing along the second oxidant gas channel 38 in the direction of arrow B.

Referring to FIGS. 1 and 6, the fuel gas flows through the fuel gas inlet manifold 24a and the inlet connection grooves 35a of the second metal separator 18 and is supplied to the inlet buffer portion 82a and the first fuel gas inlet buffer portion 37a. Likewise, referring to FIGS. 1 and 7, the fuel gas flows through the inlet connection grooves 54a of the third metal separator 20 and is supplied to the inlet buffer portion 98a and the second fuel gas inlet buffer portion 53a. Therefore, the fuel gas is supplied to the first fuel gas channel 34 of the second metal separator 18 and the second fuel gas channel 48 of the third metal separator 20.

The fuel gas is supplied to the anode electrode 68 of the first membrane electrode assembly 16a while flowing along the first fuel gas channel 34 in the direction of arrow B. Likewise, the fuel gas is supplied to the anode electrode 68 of the second membrane electrode assembly 16b while flowing along the second fuel gas channel 48 in the direction of arrow B.

Accordingly, in the first membrane electrode assembly 16a and the second membrane electrode assembly 16b, the oxidant gas supplied to the cathode electrodes 66 and the fuel gas supplied to the anode electrodes 68 cause electrochemical reactions in the electrode catalyst layers, and thereby electric power is generated.

The oxidant gas, which has been supplied to the cathode electrodes 66 of the first membrane electrode assembly 16a and the second membrane electrode assembly 16b and partially consumed, is discharged to the outlet buffer portions 74b and 90b. The oxidant gas is discharged from the first oxidant gas outlet buffer portion 30b and the second oxidant gas outlet buffer portion 42b to the oxidant gas outlet manifold 22b.

The fuel gas, which has been supplied to the anode electrodes 68 of the first membrane electrode assembly 16a and the second membrane electrode assembly 16b and partially consumed, is discharged to the outlet buffer portions 82b and 98b. The fuel gas is discharged from the first fuel gas outlet buffer portion 37b and the second fuel gas outlet buffer portion 53b to the fuel gas outlet manifold 24b through the outlet connection grooves 35b and 54b.

Referring to FIG. 1, the coolant, which has been supplied to the pair of upper and lower coolant inlet manifolds 25a, is introduced into the coolant channel 27. The coolant is supplied from the coolant inlet manifolds 25a to the coolant channel 27, temporarily flows inward in the direction of arrow C, then flows in the direction of arrow B, and cools the first membrane electrode assembly 16a and the second membrane electrode assembly 16b. Then, the coolant flows outward in the direction of arrow C and is discharged to the pair of coolant outlet manifolds 25b.

In the present embodiment, the coolant channel 27 is formed between the surface 14b of the first metal separator 14 and the surface 20b of the third metal separator 20, which are adjacent to each other. Referring to FIG. 5, on the surface 20b of the third metal separator 20, the wave-shaped channel grooves 27a, which form a part of the coolant channel 27, are formed between the plurality of wave-shaped protrusions 27t.

Referring to FIGS. 2 and 5, the inlet linear protrusions 51ta, each having a height smaller than that of each of the wave-shaped protrusions 27t, are formed so as to be continuous with the inlet end portions of the wave-shaped protrusions 27t. Moreover, the embossed protrusions 52ta, each having a height larger than that of each of the inlet linear protrusions 51ta, are connected the end portions of the inlet linear protrusions 51ta. The embossed protrusions 52ta are located closer to the inlet linear protrusions 51ta than the embossed protrusions 30ae of the first metal separator 14 are.

The outlet linear protrusions 51tb, each having a height smaller than that of each of the wave-shaped protrusions 27t, are formed so as to be continuous with the outlet end portions of the wave-shaped protrusions 27t. Moreover, the embossed protrusions 52tb, each having a height larger than that of each of the outlet linear protrusions 51tb, are connected the end portions of the outlet linear protrusions 51tb. The embossed protrusions 52tb are located closer to the outlet linear protrusions 51tb than the embossed protrusions 30be of the first metal separator 14 are.

Therefore, referring to FIG. 2, each of the inlet linear protrusions 51ta is separated from the surface 14b of an adjacent first metal separator 14, while each of the wave-shaped protrusions 27t and the embossed protrusions 52ta is in contact with the surface 14b. Accordingly, a bending stress applied to the inlet linear protrusions 51ta can be effectively reduced.

Thus, in the contact portion between the first metal separator 14 and the third metal separator 20, the distance over which the first and third metal separators 14 and 20 are held between the protrusions can be reduced. Therefore, with a simple structure, deformation of the first metal separator 14 and the third metal separator 20 when a differential pressure is applied can be effectively suppressed.

In the present embodiment, the power generation cell 12 includes three metal separators and two MEAs. However, this is not a limitation. For example, the power generation cell 12 may include two metal separators and one MEA.

According to one aspect of the embodiment, a fuel cell includes a membrane electrode assembly in which electrodes are disposed on both sides of an electrolyte membrane, and metal separators stacked on the membrane electrode assembly. A coolant channel is formed between a first metal separator and a second metal separator that are adjacent to each other, the coolant channel allowing a coolant to flow in a direction along an electrode surface.

The first metal separator includes wave-shaped protrusions between each pair of which a wave-shaped channel groove is formed, each of the wave-shaped protrusions having a wave shape in plan view, the wave-shaped channel groove being included in the coolant channel. The first metal separator includes linear protrusions connected to both ends of each of the wave-shaped protrusions, each of the linear protrusions having a height smaller than that of each of the wave-shaped protrusions; and embossed protrusions each of which is connected to an end portion of a corresponding one of the linear protrusions, each of the embossed protrusions having a height larger than that of each of the linear protrusions and being in contact with the second metal separator.

In the fuel cell, preferably, the second one of the metal separators includes other embossed protrusions that are located farther from the linear protrusions than the embossed protrusions of the first one of the metal separators are, the other embossed protrusions protruding in a direction opposite to a direction in which the embossed protrusions of the first one of the metal separators protrude and each having a height the same as that of each of the embossed protrusions of the first one of the metal separators.

With the present disclosure, the linear protrusions each have a height smaller than that of each of the wave-shaped protrusions, and the embossed protrusions, each having a height larger than that of each of the linear protrusions, are disposed at the end portions of the linear protrusions. Therefore, the first one of the metal separators can be in contact with the second one of the metal separators at the wave-shaped protrusions and the embossed protrusions. Accordingly, a bending stress applied to the linear protrusions can be effectively reduced.

Thus, in the contact portion between the metal separators, the distance over which the metal separators are held between the protrusions can be reduced. Therefore, with a simple structure, deformation of the metal separators when a differential pressure is applied can be effectively suppressed.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell comprising:
a membrane electrode assembly in which electrodes are disposed on both sides of an electrolyte membrane; and
metal separators stacked on the membrane electrode assembly,
wherein a coolant channel is formed between a first metal separator and a second metal separator that are adjacent to each other, the coolant channel allowing a coolant to flow in a direction along an electrode surface,
wherein the first metal separator includes
wave-shaped protrusions between each pair of which a wave-shaped channel groove is formed, each of the wave-shaped protrusions having a wave shape in plan view, the wave-shaped channel groove being included in the coolant channel,
linear protrusions connected to both ends of each of the wave-shaped protrusions, each of the linear protrusions having a height smaller than that of each of the wave-shaped protrusions such that the linear protrusions are separated from and are not in contact with the second metal separator, and
embossed protrusions each of which is connected to an end portion of a corresponding one of the linear protrusions, each of the embossed protrusions having a height larger than that of each of the linear protrusions and being in direct contact with the second metal separator, and
wherein the second metal separator includes other embossed protrusions that are located farther from the linear protrusions than the embossed protrusions of the first metal separator are, the other embossed protrusions protruding in a direction opposite to a direction in which the embossed protrusions of the first metal separator protrude and each having a height the same as that of each of the embossed protrusions of the first metal separators.

2. A fuel cell comprising:
a membrane electrode assembly having a first end and second end opposite to the first end in an extending direction and comprising:
an electrolyte membrane; and
first and second electrodes sandwiching the electrolyte membrane therebetween in a stacking direction substantially perpendicular to the extending direction;
a first metal separator stacked on the membrane electrode assembly in the stacking direction;
a second metal separator stacked on the first metal separator in the stacking direction to define a coolant channel between the first metal separator and the second metal separator, the coolant channel extending in the extending direction;
the first metal separator including wave-shaped protrusions each of which has a wave shape viewed in the stacking direction and projects from the first metal separator toward the second metal separator by a first height in the stacking direction to define a wave-shaped channel groove between the wave-shaped protrusions to form the coolant channel, each of the wave-shaped protrusions having a first distal end and a second distal end opposite to the first distal end in the extending direction;
first and second linear protrusions connected to the first distal end and the second distal end of each of the wave-shaped protrusions, respectively, each of the first and second linear protrusions having a straight shape extending in the extending direction and projecting from the first metal separator toward the second metal separator by a second height in the stacking direction, the second height being smaller than the first height, the first and second linear protrusions being separated from and not in contact with the second metal separator; and
first and second embossed protrusions connected to a first tip end of the first linear protrusion and a second tip end of the second linear protrusion, respectively, the first and second embossed protrusions projecting from the first metal separator toward the second metal separator by a third height in the stacking direction to be in direct contact with the second metal separator, the third height being larger than the second height,
wherein the second metal separator includes other embossed protrusions that are located farther from the linear protrusions than the embossed protrusions of the first metal separator are, the other embossed protrusions protruding in a direction opposite to a direction in which the embossed protrusions of the first metal separator protrude and each having a height the same as that of each of the embossed protrusions of the first metal separators.

3. The fuel cell according to claim 2,
wherein the first and second embossed protrusions are directly connected to the first linear protrusion and the second linear protrusion, respectively.

4. The fuel cell according to claim 1,
wherein the embossed protrusions project toward the second metal separator.

5. The fuel cell according to claim 1,
wherein the embossed protrusions are directly connected to the corresponding one of the linear protrusions.

6. A fuel cell comprising:
a membrane electrode assembly in which electrodes are disposed on both sides of an electrolyte membrane; and
metal separators stacked on the membrane electrode assembly,
wherein a coolant channel is formed between a first metal separator and a second metal separator that are adjacent to each other, the coolant channel allowing a coolant to flow in a direction along an electrode surface,
wherein the first metal separator includes
  wave-shaped protrusions between each pair of which a wave-shaped channel groove is formed, each of the wave-shaped protrusions having a wave shape in plan view, the wave-shaped channel groove being included in the coolant channel,
  linear protrusions connected to both ends of each of the wave-shaped protrusions, each of the linear protrusions having a height smaller than that of each of the wave-shaped protrusions such that the linear protrusions are separated from and are not in contact with the second metal separator, and
  embossed protrusions each of which is connected to an end portion of a corresponding one of the linear protrusions, each of the embossed protrusions having a height larger than that of each of the linear protrusions and being in direct contact with the second metal separator,
wherein the first metal separator has a longitudinal direction, and
wherein both ends of each of the wave-shaped protrusions are substantially aligned in the longitudinal direction.

7. The fuel cell according to claim 6,
wherein the wave-shaped protrusions each have a shape extending along the longitudinal direction with a wave periodically provided along a second direction perpendicular to the longitudinal direction.

8. A fuel cell comprising:
a membrane electrode assembly having a first end and second end opposite to the first end in an extending direction and comprising:
  an electrolyte membrane; and
  first and second electrodes sandwiching the electrolyte membrane therebetween in a stacking direction substantially perpendicular to the extending direction;
a first metal separator stacked on the membrane electrode assembly in the stacking direction;
a second metal separator stacked on the first metal separator in the stacking direction to define a coolant channel between the first metal separator and the second metal separator, the coolant channel extending in the extending direction;
the first metal separator including wave-shaped protrusions each of which has a wave shape viewed in the stacking direction and projects from the first metal separator toward the second metal separator by a first height in the stacking direction to define a wave-shaped channel groove between the wave-shaped protrusions to form the coolant channel, each of the wave-shaped protrusions having a first distal end and a second distal end opposite to the first distal end in the extending direction;
first and second linear protrusions connected to the first distal end and the second distal end of each of the wave-shaped protrusions, respectively, each of the first and second linear protrusions having a straight shape extending in the extending direction and projecting from the first metal separator toward the second metal separator by a second height in the stacking direction, the second height being smaller than the first height, the first and second linear protrusions being separated from and not in contact with the second metal separator; and
first and second embossed protrusions connected to a first tip end of the first linear protrusion and a second tip end of the second linear protrusion, respectively, the first and second embossed protrusions projecting from the first metal separator toward the second metal separator by a third height in the stacking direction to be in direct contact with the second metal separator, the third height being larger than the second height,
wherein the first distal end substantially aligns with the second distal end in the extending direction.

9. The fuel cell according to claim 8,
wherein the wave-shaped protrusions each have a shape extending along the extending direction with a wave periodically provided along a second direction perpendicular to the extending direction.

* * * * *